United States Patent [19]

Kashiwagi

[11] Patent Number: 4,716,425
[45] Date of Patent: Dec. 29, 1987

[54] THERAPEUTIC TOMOGRAPHIC SYSTEM

[75] Inventor: Atsumi Kashiwagi, Nara, Japan

[73] Assignee: Fujimoto Photo Industrial Co., Ltd., Osaka, Japan

[21] Appl. No.: 940,461

[22] Filed: Dec. 11, 1986

[30] Foreign Application Priority Data

May 29, 1986 [JP] Japan .................................. 61-124945
May 29, 1986 [JP] Japan .................................. 61-124946

[51] Int. Cl.⁴ ........................ G03B 29/00; G03B 27/60
[52] U.S. Cl. ........................................ 354/76; 355/73
[58] Field of Search ...................... 354/76; 355/18, 20, 355/27, 73

[56] References Cited

U.S. PATENT DOCUMENTS

| | | | |
|---|---|---|---|
| 3,157,101 | 11/1964 | Rabinow | 355/73 |
| 3,451,754 | 6/1969 | Prew | 355/73 |
| 3,689,150 | 9/1972 | Northmann et al. | 355/73 X |
| 4,566,767 | 1/1986 | Akisada et al. | 354/76 |

FOREIGN PATENT DOCUMENTS 60937 5/1980 Japan ..................................... 354/76

Primary Examiner—Donald A. Griffin
Attorney, Agent, or Firm—Armstrong, Nikaido, Marmelstein & Kubovcik

[57] ABSTRACT

A therapeutic tomographic system in which the film on which the image appearing on a monitor television is to be projected is adsorbed through a feed belt on a low pressure box whose interior is held at a negative pressure. And the feed belt with the film adsorbed thereon is reciprocally moved.

5 Claims, 6 Drawing Figures

THERAPEUTIC TOMOGRAPHIC SYSTEM

BACKGROUND OF THE INVENTION

The present invention relates to a therapeutic tomographic system and more particularly, it pertains to a tomographic system for use in CT test which is used for fixing a plurality of picture images appearing on a monitor television on a rectangular sheet of film.

In conventional tomographic system of this type, the film is fed, while being in sliding contact with a stationary receiving surface. In that state, there is a fear that the film might be injured at its back and the aforementioned sliding contact produces static, causing dust and dirt to stick on the film.

Further, the conventional film positioning and holding means was inadequate to bring exactly to the specified film position the photographic optical axis which is projected from the monitor television through a camera section.

Against this background, the objects of this invention are to (1) prevent injury of film back, (2) prevent static generation on the film, (3) hold the film exactly in planar form, when taking a picture, (4) move the film to a proper position relative to the photographic optical axis and hold it there, and (5) simplify the structure by effectively utilizing the joint part of the endless feed belt both as a film holder and as a drive transmitter.

DESCRIPTION OF THE PREFERRED EMBODIMENTS

The present invention will become more apparent from a detailed description taken in conjunction with the accompanying drawings.

Figure 1A:
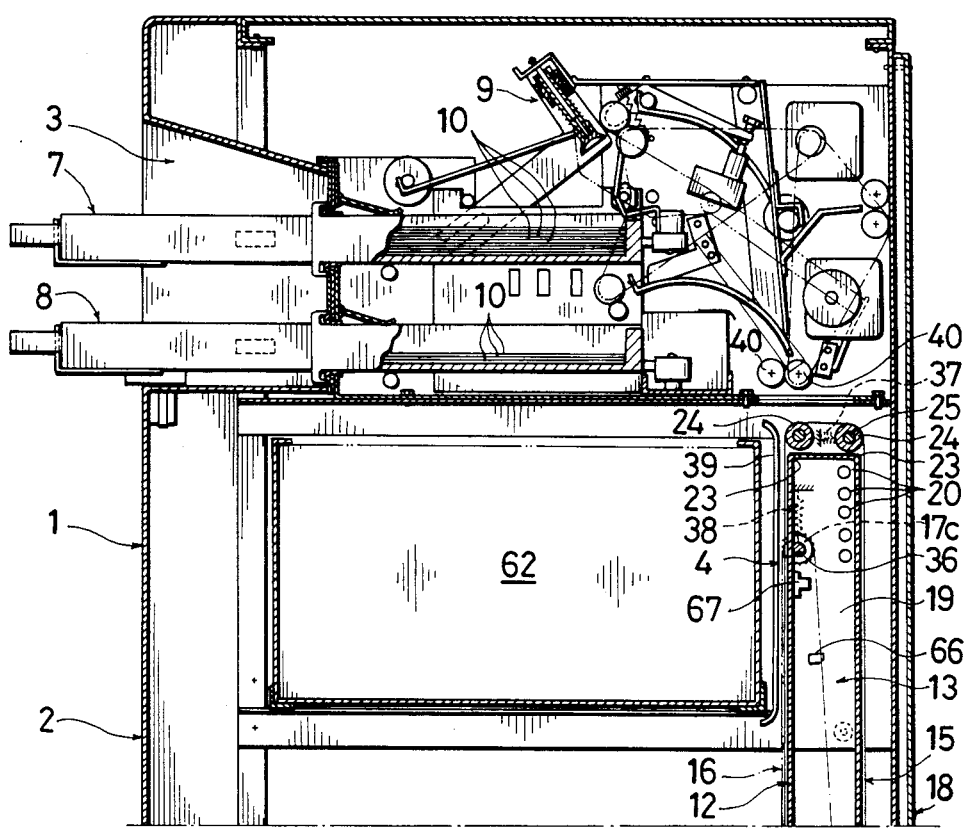
FIG. 1A is a sectional side view of the upper half part of a therapeutic tomographic system showing a first embodiment of this invention.
Figure 1B:
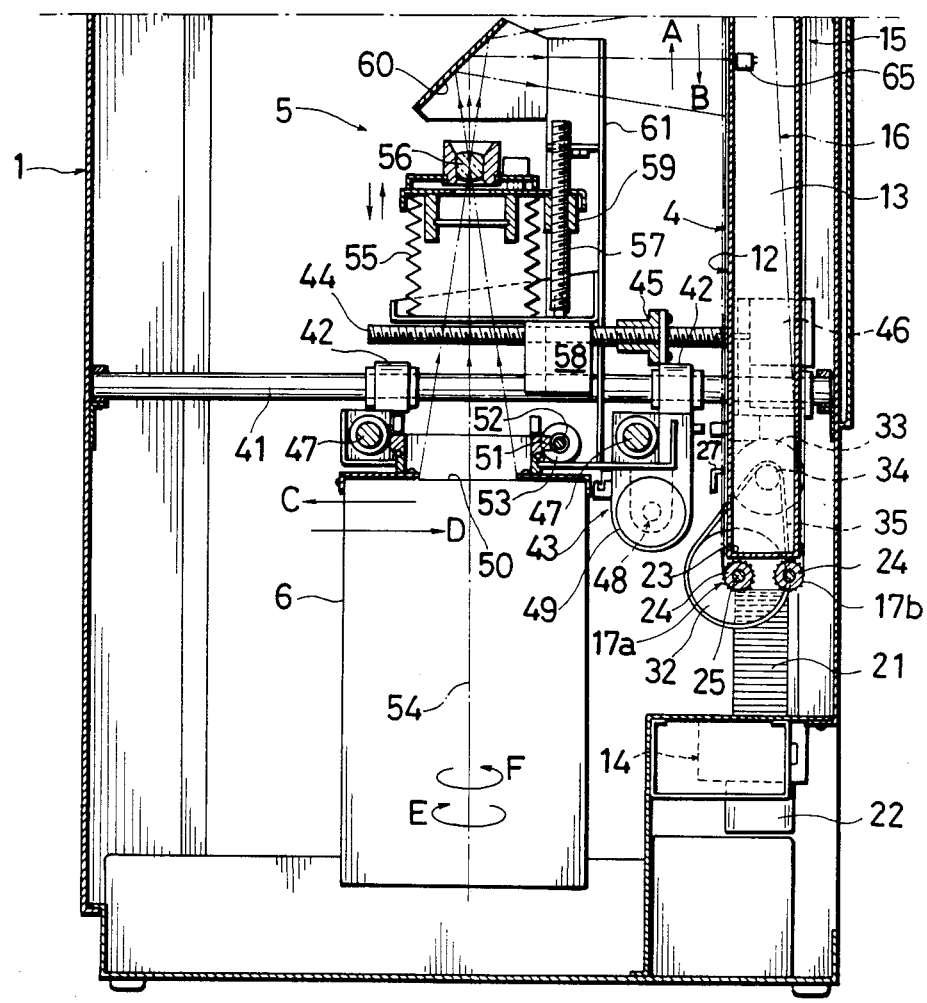
FIG. 1B is a sectional side view of the lower half part of this system.

FIGS. 1A and 1B are sectional side views respectively showing the upper and lower half parts of a therapeutic tomographic system 1. Thus these two figures put together provide a sectional side view of the whole of the system of this invention. This photographic system 1 has a housing 2; a film auto-loader 3 is placed at the upper part of the interior of said housing 2; toward back of said interior, there is provided a vertical film holding means 4 which receives each film dropped in one by one from said auto-loader 3 and hold it in vertical posture; further, a camera section 5 is arranged at the central part of said interior and at the lower part, a monitor television 6 is installed.

Figure 4:
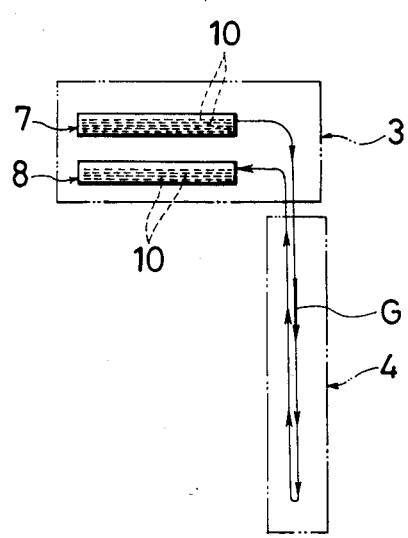
FIG. 4 is an explanatory diagram of a simplified structure of this system.

In this film auto-loader 3, as shown in FIGS. 1A and 4, films are taken out one by one from a horizontal set magazine 7 housing rectangular films and each film is carried (dropped) to the lower picture taking position-or a vertical film holding means 4-while being turned in direction to its vertical posture; then, the film on which the photo has been taken is changed in direction from vertical to horizontal posture, to be housed in a receiving magazine 8.

This film auto-loader 3 is equipped with a well-known sheet feeder 9 as disclosed by U.S. Pat. No. 4,508,331, etc., which has already been proposed by this inventor.

And the vertical film holding means 4 is as shown in FIGS. 1A, 1B, 2 and 3, composed of a flat low pressure box 13 having at its front a vertical receiving surface 12 through which a lot of vent holes 11 are bored, a vacuum pump 14 like a blower, etc., for discharging air within said low pressure box 13, a feed belt 15 circumscribingly mounted on this low pressure box 13 and adapted to reciprocally move in the directions of arrow marks A and B, chains 16 and sprockets 17a, 17b, 17c, . . . , for driving said belt 15, etc.

The low pressure box 13 is vertically held in the vicinity of the back 18 of the housing 2, with cooling holes 20 . . . bored through the side wall 19 of the low pressure box 13 (refer to FIG. 1A), as appropriate. Air inside the housing 2 is sucked into the low pressure box 13 through said cooling holes 20 . . . and further, discharged out of the housing 2 by means of a vacuum pump 14, thereby providing the cooling action inside the housing 2. Further, as described later with reference to FIG. 2, the aforementioned cooling holes 20 play the role of preventing the internal pressure of the low pressure box 13 from becoming excessive negative pressure, thereby imposing overload on the vacuum pump 14, or disfigurement of the low pressure box 13 under the state of all vent holes 11 . . . in the receiving surface 12 being closed with the film adsorbed on the receiving surface 12.

The vacuum pump 14 and the low pressure box 13 are communicated with a hose 21, etc., and said vacuum pump 14 is driven by a motor 22.

Figure 3:
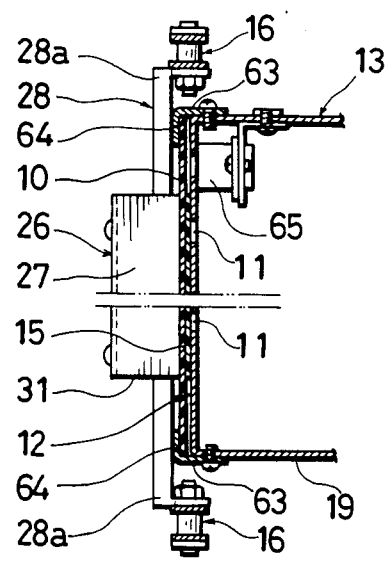
FIG. 3 is an enlarged sectional plan view of an essential part of this system.

The feed belt 15 is, as shown in FIG. 3, interposed between the film 10 and the receiving surface 12, thus making direct contact with the back of the film 10. And said feed belt 15, as shown in FIGS. 1A and 1B, is endlessly hung on idler rollers 24 . . . respectively placed parallel and adjacent to the horizontally extending four edges 23 . . . of the low pressure box 13. The idler rollers 24 are pivotally mounted on their respective supporting shafts 25, to be rotatable therearound. The upper rear supporting shafts 25, of these four supporting shafts 25 . . . , is pressed backward by means of a springy member 37, thereby imparting a tension to the belt 15 at all times. And this feed belt 15 is made of a black low friction material like ethylene tetrafluoride resin, etc., and is provided with a lot of holes for adsorption (not shown in these figures) which permit transmission of air to effect the adsorption of the film 10 thereon.

Figure 2:
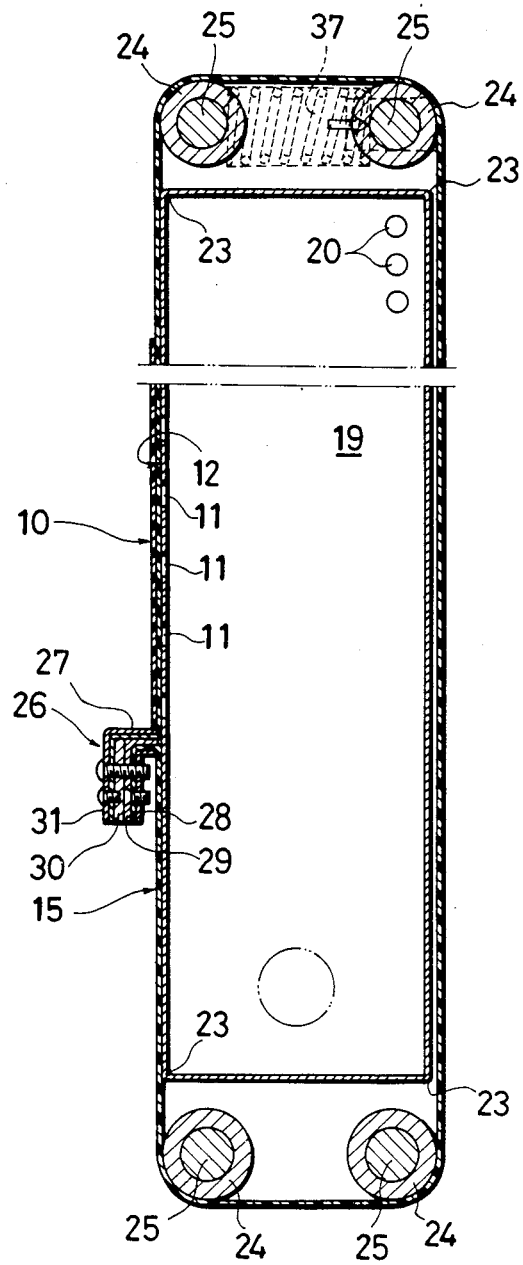
FIG. 2 is an enlarged sectional side view of an essential part of this system.

Further, the joint part 26 of said endless feed belt 15 is arranged on the receiving surface 12 side of the low pressure box 13 and said joint part 26 is so formed as to forwardly project, to provide the film holding part 27 for holding the lower edge of the film 10, as shown in FIGS. 2 and 3. This film holding part 27, is particularly as shown in FIGS. 2 and 3, composed of an angle shape chain coupler bar 28, an angle shape pinching member 29 which holds one end of the feed belt 15 between it and said coupler bar 28 and in- and out-side pinching members 30 and 31 which hold between them the other end of the feed belt 15. Thus the chain coupler bar 28 is doubled as part of the joint member for pinching both ends of the feed belt 15. The inner pinching member 30 is formed of a strip and the outer pinching member 31 is comprised of an angle shape plate member whose cross-sectional shape has a bent angle a little smaller than a right angle.

The upper surface of this outer pinching part 31 is a member for directly receiving the lower end edge of the film 10 which has been dropped from the film auto-loader 3 located thereabove, thus forming the main part of the aforementioned film receiving part 27. Furthermore, since the upper surface of the outer pinching member is inclined a little back- and downward, the lower edge of film 10 is advantageously moved rearward-that is, to the receiving surface 12 side.

Next, a pair of right and left sprockets 17a, 17a are fixedly set to both right and left ends of the lower front one of the four supporting shafts 25, with a large pulley 32 securely mounted on this supporting shaft 25, for them to turn integrally with the large pulley 32. The turning effort of the small pulley 34 securely mounted on the driving shaft of a stepping motor 33 is transmitted to the large pulley 32 through a timing belt 35. The other sprockets 17b, 17b are rotatably and pivotally mounted on both right and left ends of the lower rear one of the four supporting shafts 25 and still other sprockets 17c, 17c are rotatably and pivotally mounted on both right and left ends of a horizontal supporting shaft 36 located at the upper end of low pressure box 13 and just along back of the receiving surface 12.

In this way, the sprockets 17a, 17b, 17c, . . . , are composed in three pairs, respectively being arranged at positions of the apices of a longitudinally oblong triangle, as seen from one side, and on them, two lines of endless chain 16, 16 are hung.

One side of this triangle is so arranged as to be nearly coincided with the receiving surface 12, as clearly seen from one side, FIGS. 1A and 1B. And as shown in FIG. 3, the right and left ends 28a, 28a of the aforementioned chain coupling bar 28 are connected to parts of said pair of right and left chains, thereby interlocking the chains 16, 16 with the feed belt 15.

The supporting shaft 36 of the upper sprocket 17c is elastically biased upward by means of an springy member 38 such as coil spring, etc., to prevent slackening of the chain 16.

A film leading guide plate 39 is placed facing the upper part of the receiving surface 12 with a small clearance therebetween, the aforementioned clearance formed by the top of said guide plate 39 and the receiving surface 12 corresponding to the last guide roller 40, 40 of the film auto-loader just therebelow.

A heavy monitor television 6 is incorporated in the lower part of the housing 2, to be movable to right-left and fore-aft in a horizontal plane. Explaining the supporting structure and driving mechanism of this monitor television 6, a pair of guide rods 41, 41 extending in the fore-aft direction are provided inside the housing 2, and pendently suspending member 43 having bosses 42 . . . which are externally fitted on the guide rods 41, 41 are mounted thereon. This pendently suspending member 43 comprises a fore-aft direction driving means, together with a screw shaft 44 horizontally placed in the fore-aft direction, a nut member 45 screw-fitted thereon and a motor 46 which turns the aforementioned screw shaft 44 normally and reversely, said means effecting the reciprocal movement of the monitor television 6 as indicated by arrow marks C and D.

Further, this pendently suspending member 43 is composed of an upper half part and a lower half part, said upper and lower half parts being coupled through a pair of guide rods 47, 47, such that the movement of said lower half part may be permitted in a direction at a right angle to the paper surface of FIG. 1B. And by turning by a motor 49 a screw shaft 48 extending in the direction at a right angle to the paper surface, the monitor television 6 is reciprocally moved in the direction-that is, the direction at a right angle to the paper surface.

The screen 50 of the monitor television 6 is looking upward and said monitor television 6 is hung by the aforementioned pendently suspending member 43, such that this screen 50 may be rotatable around the axial center 54. As the mechanism for making 90 degrees swinging movement by turning the whole of the monitor television 6 around this axial center 54, as shown by arrow marks E and F, various well-known means are usable. For example, it may be composed of a large diameter wheel gear 51 whose center coincides with the axial center 54, a worm gear 52 which meshes therewith and a driving motor 53 which turns this worm gear 52, etc.

The camera section 5 is located just above the monitor television 6 and equipped with a bellows 55 and a lens 56, such that their axial center coincides with the aforementioned axial center 54. Further, in this camera section 5, there is provided for focusing of the lens 56 a vertical lens position adjusting mechanism consisting of a screw shaft 57, a motor 58 for driving it and nut member 59.

Further, upward of the lens 56, a mirror 60 inclined at about 45 degrees is supported by a supporting member 61. Thus, this mirror 60 turns by 90 degrees the direction of the light coming upward from the screen 50 of the monitor television 6, to project it on a vertical film held along the receiving surface 12 at the rear.

Figure 5:
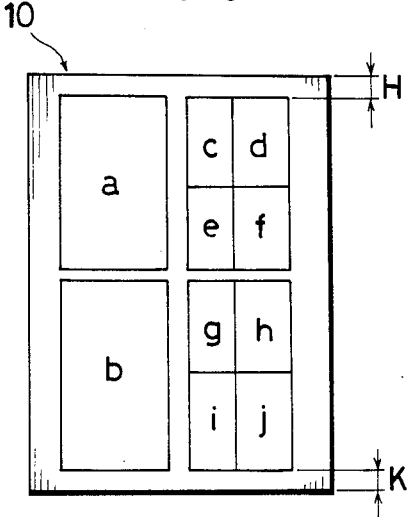
FIG. 5 is a front view illustrating a film.

Between the mirror 60 and the film auto-loader 3, there is installed an electronic control 62. This electronic control 62 adjusts the multiplication by reciprocally moving the monitor television 6 in the directions of the arrow marks C and D (fore-aft direction), successively switches the right-left position of a plurality of pictures a, b, c, . . . , i and j by making its reciprocal movement in the direction at a right angle to the paper surface (right-left direction), as seen in FIG. 1B, and further, has the feed belt 15 run by way of control of the stepping motor 33 (through the chains 16), to switch the vertical position of a film 10 vertically held, thereby successively switching the vertical position of a plurality of pictures a, b, . . . j on the film 10 as illustrated in FIG. 5.

As hereabove-described, the monitor television 6 moves fore-aft and right-left in a horizontal plane to switch the multiplicity and the right left position of the pictures a, b, . . . , j and the film 10 is also moved up-down in the vertical plane, to switch the vertical position of the pictures a, b, . . . , j. The advantage derived from such a structuring lies that the heavy monitor television 6 need not be moved in the up-down direction (light film 10 and belt 15 are run up-down instead); therefore, that only a small power is required, and that rapid switching is realizable.

Thus, as shown in FIG. 3, at the right and left side edges of the receiving surface 12 of the low pressure box 13, film guide recessed grooves 64, 64 are formed by providing angles 63, 63 and so forth, so that the film 10 may be securely held thereby in a planar state in colaboration with the feed belt 15, when dropped from the film auto-loader 3, as indicated by the arrow mark G in FIG. 4. Further, a film detecting mechanism 65 like a photosensor, etc., is placed on the receiving surface 12 side end part where no feed belt 15 exists, as shown in FIG. 3. As the film 10 is fed from the upper part film auto-loader 3 and goes down along the receiving surface 12, the film detecting mechanism 65 detects it; then, the vacuum pump 14 like a blower, etc., is brought into operation immediately or after a while, to discharge the air inside the low pressure box 13, thereby maintaining the film in more completely planar state.

Besides, as shown in FIG. 1A, not only a protrusion 66 is attached to a part of each chain 16, but a detector 67 like a magnetic sensor or a photo-sensor, etc., with which to detect this protrusion 66 is installed on a part of the outer surface of the low pressure box 13, whereby the vertical position of the film holder 27 (FIG. 1B) is checked, every time the chains 16 and the feed belt 15 have made a reciprocal movement. In this way, the vertical arrangement of respective pictures a, b, . . . , j shown in FIG. 5 is brought to their correct positions and especially the dimensions H and K of the upper and lower margins are equalized, whereby the centering is ensured.

According to this invention, as hereabove described, the film 10 is fed integrally with the feed belt 15, without making direct sliding touch on the receiving surface 12 of the low pressure box 13; consequently, injury on the back of the film and the trouble accompanying the generation of static are averted. Besides, due to the negative pressure of the low pressure box 13, air is sucked in through the receiving surface and the feed belt 15; therefore, the film is adsorbed on the vertical receiving surface 12, to be kept truely planar, yielding an accurate image. Further, since a film 10 and a belt 15 which are light in weight are run up-down, instead of moving the heavy monitoring television 6 in the up-down direction, only a small power is required and moreover, rapid switching of film-making position can be done by the feeding of a light feed belt involving a small force of inertia. In addition, the film 10 may be moved to an accurate position relative to the photographing optical axis and held there; for example, orderly arrangement of respective pictures in their specified positions on the film 10, as shown in FIG. 5, is possible. Furthermore, the joint part 26 is of a structure which functions as a film holder 27 as well as a chain coupler, thus making the feed belt 15 light in weight and making for its simplified structure.

I claim:

1. A therapeutic tomographic system for projecting on a film an image appearing on a monitor television, comprising,
    a low pressure box whose interior is held at a negative pressure and which is provided with a vertical receiving surface having a large number of vent holes, and
    a feed belt interposed between said film and said receiving surface, which directly receives said film owing to adhesive power of said low pressure box, to be integrated therewith, and which in that state, reciprocally moves in vertical direction.

2. The therapeutic tomographic system according to claim 1, wherein the feed belt is reciprocally moved by a pair of chains in vertical direction.

3. The therapeutic tomographic system according to claim 2, wherein while the feed belt is coupled at a joint part arranged in correspondence with the receiving surface of the low pressure box, to be formed endless, circumscribing said low pressure box, said joint is protruded to form a film holder, thereby to hold a bottom edge of the film.

4. The therapeutic tomographic system according to claim 3, wherein a chain coupler bar coupled with a pair of chains at its right and left ends is provided at the joint part.

5. The therapeutic tomographic system according to claim 4, wherein the chain coupler bar is doubled as a part of the joint member which pinches both end parts of the feed belt.

* * * * *